July 22, 1941.  J. W. YOUNG  2,250,320

THERMOMETER MOUNT

Filed June 1, 1939  2 Sheets-Sheet 1

Inventor
John W. Young
By F. L. Walker
Attorney

July 22, 1941.  J. W. YOUNG  2,250,320
THERMOMETER MOUNT
Filed June 1, 1939   2 Sheets-Sheet 2

Inventor
John W. Young
By F. C. Walker
Attorney

Patented July 22, 1941

2,250,320

UNITED STATES PATENT OFFICE 2,250,320

THERMOMETER MOUNT

John W. Young, Pacific Palisades, Calif.

Application June 1, 1939, Serial No. 276,864

2 Claims. (Cl. 297—3)

This invention pertains to thermometer mounts, and more particularly to means for mounting one or more thermometers in the oil line of an airplane engine, motor vehicle, boat, or the like, and the mode of assuring identical remote temperature readings.

Inasmuch as saving of weight and space is of paramount importance in airplane design, the present unit and mode of installation has been developed wherein the thermo-responsive elements of plural remote indicating thermometers are incorporated in a pipe coupling and drain fitting, in such relation that the respective thermometer bulbs are subjected to uniform wash of the passing lubricant or other circulating fluid.

It is highly desirable that remote temperature readings be provided at different points in the ship, as for example, in both the forward and aft cockpits. The usual mode of installation has been to insert different additional fittings in the line or to drill the pipe line and weld a hub onto the side through which the thermometer bulb may be diagonally inserted. This, however, unduly restricts the pipe line, and if a second thermometer reading is desired, it is necessary to provide such second installation at a different point in the pipe line, which not only further restricts the flow therethrough but, the respective thermometer bulbs being spaced apart, a greater or less distance may not give exactly the same temperature readings, which will be confusing, and such separate installations increases the weight to be carried.

A drain fitting is a necessary adjunct in the lubricant circulatory system. By the present composite arrangement the coupling or drain fitting is amply enlarged coincident with the position of the thermometer bulbs to afford unrestricted flow of lubricant or other fluid there past. The plural thermometer bulbs being positioned coincident with each other are subject to exactly the same conditions and temperature influence and hence will afford identical readings. Such combined arrangement obviates the necessity of additional or separate thermometer mount fittings and necessitates but slight diametrical enlargement of the drain fitting branches with little, if any, added weight. Consequently, in such installations wherein weight and space are such important factors, the present assembly has been found quite advantageous.

The primary object of the invention is to provide a thermometer mounting for fluid circulatory systems which may not only be economically manufactured and which will be of compact form and of minimum additional weight, but which will be more efficient in use and will enable plural thermometers to be subjected to identical conditions and temperature influence, hence enabling reliable remote indications at different points.

A further object of the invention is to provide a pipe fitting having therein a thermometer well so constructed and arranged as to receive one or more thermometer elements without restricting the flow of fluid through the fitting.

A further object of the invention is to provide a composite drain fitting and thermometer mount.

A further object of the invention is to provide an improved method of taking plural thermometer readings wherein the thermally responsive elements will be subjected to identical conditions and thermal influence.

A further object of the invention is to provide a combined drain fitting and thermometer mount having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a front elevation of the thermometer mount and drain fitting comprising the present invention, wherein the position of the thermometer elements is indicated by dotted lines.

Like parts are indicated by similar characters of reference throughout the several views.

Figure 1:
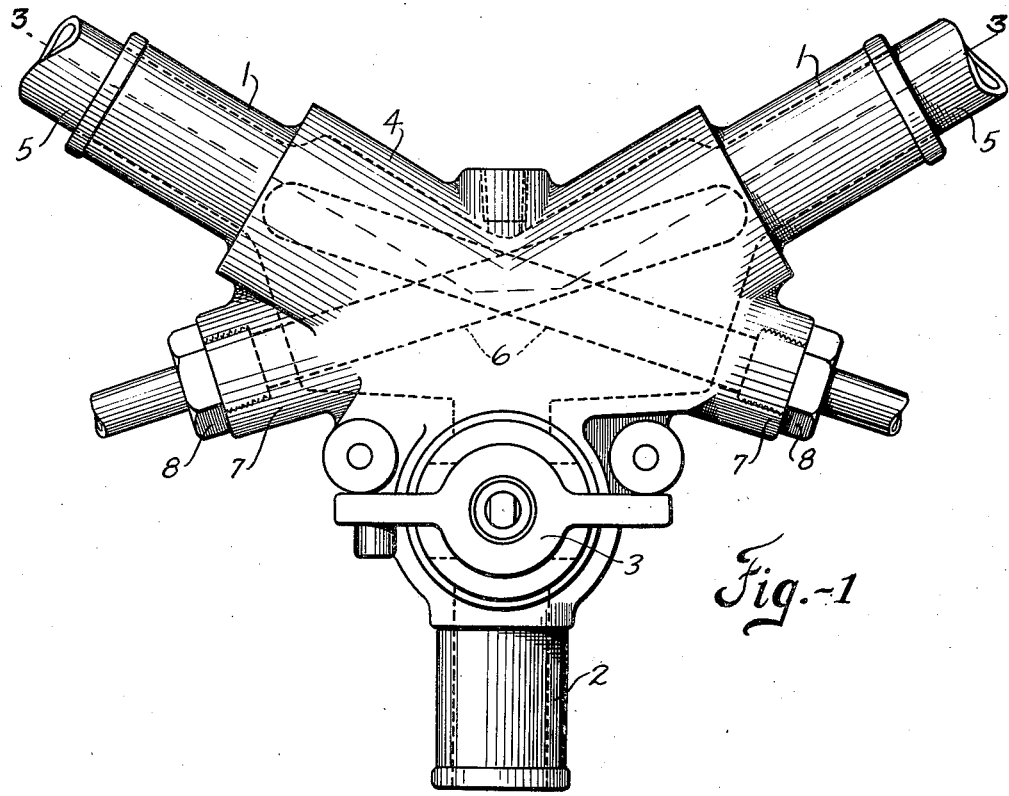
Figure 2:
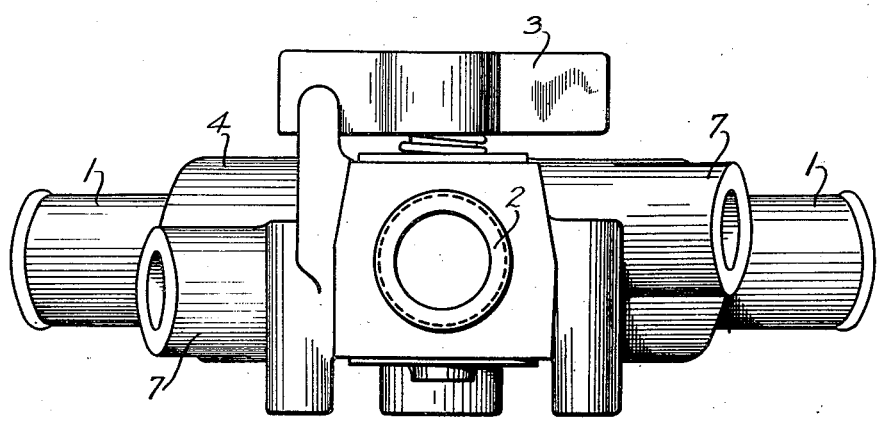
Fig. 2 is a bottom plan view thereof.

It is quite customary practice in engine design, especially for airplane use, also for motor boats and vehicles, to provide for repetitious circulation of lubricant through the engine bearings and back to a supply reservoir. It is equally common practice to provide in such circulatory system, preferably between the engine and the storage reservoir, a drain cock through which the lubricant may be withdrawn for examination or for replacement. The present fitting to be connected into a continuing pipe line of the circulatory system comprises a trifurcate conduit, the two opposite branches 1—1 of which afford continuous passage for fluid flow entering one branch or arm and leaving through the other. The pendant branch 2 has therein a rotary cut-off valve 3 which upon being opened permits drainage of fluid from the circulatory system through both branches 1—1 and connecting portions of the pipe line.

The body portion 4 of the fitting is of somewhat larger diameter than its terminals and the continuing portions of the pipe line 5 and affords a well or chamber to accommodate two thermometer elements 6, without unduly restricting the flow of fluid from one lateral branch to the other or through the pendant drain cock 2. Communicating with the enlarged medial portion 4, but laterally offset out of the axial plane of the respective branches 1, are counterbored bosses or hubs 7 through which the thermally responsive elements 6 of remote indicating thermometers are inserted. The hubs 7 receive packing nuts 8 surrounding the thermometer element inserts and engaging packing material within the counterbores of the hubs to prevent leakage.

The respective thermometer elements 6, while not axially aligned with the respective branches 1, occupy identical relations thereto. The thermometer elements are transversely disposed in parallel planes, as best shown in Fig. 1. Each element 6 is subjected to the same wash of flowing fluid and hence will be equally influenced by temperature fluctuations thereof.

Figure 3:
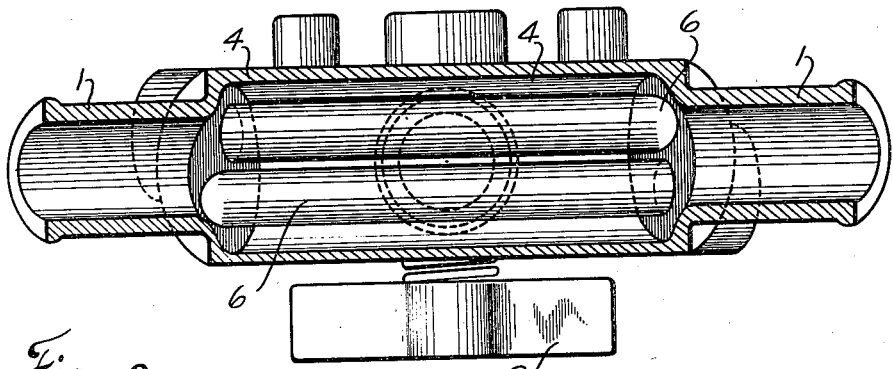
Fig. 3 is a horizontal sectional view on line 3—3 of Fig. 1.
Figure 4:
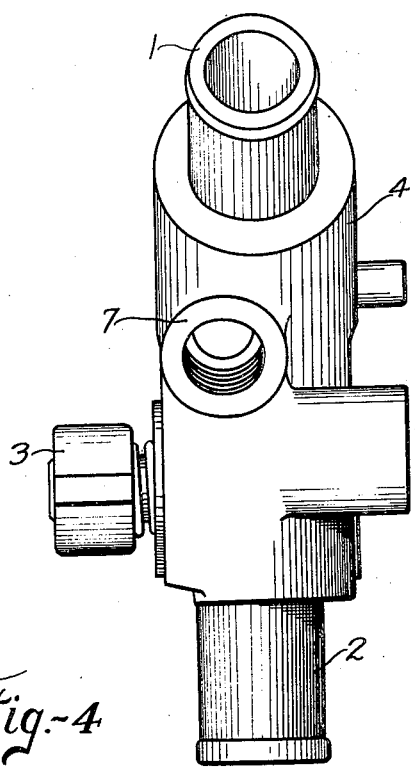
Fig. 4 is an end elevation.

The capacity of the enlarged medial body portion 4 is sufficiently deep as shown by dotted lines in Fig. 1 and amply wide as shown in the sectional view, Fig. 3, to afford a well or pool wherein the flow of fluid will be somewhat less turbulent and any acute fluctuations of fluid temperature will be somewhat equalized, thereby stabilizing the remote temperature readings. At the same time, such enlargement and increased carrying capacity prevents retardation of the fluid circulation from one branch to the other or its escape through the drain cock by inserted elements 6.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A thermometer mount for use in the oil cooling system of an airplane engine composed of a hollow body having four branches arranged in pairs divergently related and the pairs being oppositely disposed to each other, one pair of branches being tubular to provide conduits for the oil which enters one conduit and egresses through the other, a pair of thermometer elements connected to and extending through the other pair of branches and crossing each other at substantially the center of the body and disposed to conjointly provide a generally X-shaped form and each having an inner end disposed within the conduit adjacent said inner end, the longitudinal axis of each of the thermometer elements extending at an angle to the longitudinal axis of the oil conduit into which it projects and said oil conduits being disposed at such angle to the body so that same and the body provide a substantially continuous and gradually curved flow line, whereby a substantially low pressure drop of the oil at the juncture of the conduits is had.

2. A thermometer unit in accordance with claim 1, wherein the divergence of the angularity between the thermometer elements is greater than that between the bores of the pair of branches which provide conduits for the oil, and wherein the planes in which the thermometer elements lie are offset laterally of the body with respect to the plane in which the branches that provide the oil conduits lie.

JOHN W. YOUNG.